(12) United States Patent
Takeuchi et al.

(10) Patent No.: US 10,920,877 B2
(45) Date of Patent: Feb. 16, 2021

(54) CONTROL APPARATUS FOR VEHICULAR TRANSMISSION

(71) Applicants: Toyota Jidosha Kabushiki Kaisha, Toyota (JP); Toyota Motorsport GmbH, Cologne (DE)

(72) Inventors: Shinichi Takeuchi, Nisshin (JP); Akihiko Ichikawa, Toyota (JP); Tomohiro Yoshimura, Toyota (JP); Tomomitsu Terakawa, Anjo (JP); Jun Yabuta, Nagoya (JP); Klemens Pollmeier, Frechen (DE); Lars van Leeuwen, Baarlo (NL); Andree Miller, Frechen (DE); Patrizio Agostinelli, Viersen (DE)

(73) Assignees: Toyota Jidosha Kabushiki Kaisha, Toyota (JP); Toyota Motorsport GmbH, Cologne (DE)

( * ) Notice: Subject to any disclaimer, the term of this patent is extended or adjusted under 35 U.S.C. 154(b) by 484 days.

(21) Appl. No.: 15/795,598

(22) Filed: Oct. 27, 2017

(65) Prior Publication Data

US 2018/0119802 A1 May 3, 2018

(30) Foreign Application Priority Data

Oct. 27, 2016 (JP) .............................. JP2016-211125

(51) Int. Cl.
*F16H 61/34* (2006.01)
*F16H 59/68* (2006.01)
(Continued)

(52) U.S. Cl.
CPC ......... *F16H 61/0437* (2013.01); *F16H 3/091* (2013.01); *F16H 61/68* (2013.01);
(Continued)

(58) Field of Classification Search
CPC ................. F16H 61/0437; F16H 59/68; F16H 2003/0811; F16H 2061/047; F16H 2061/0474
(Continued)

(56) References Cited

U.S. PATENT DOCUMENTS 4,836,348 A * 6/1989 Knodel ................... F16D 23/06
192/114 T
4,905,806 A * 3/1990 Hillenbrand ........ F16D 23/0606
192/108

(Continued)

FOREIGN PATENT DOCUMENTS

DE 694 06 416 T2 5/1998
DE 691 31 040 T2 11/1999
(Continued)

*Primary Examiner* — Ha Dinh Ho
(74) *Attorney, Agent, or Firm* — Oblon, McClelland, Maier & Neustadt, L.L.P.

(57) ABSTRACT

A control apparatus for a vehicular transmission including at least one dog clutch each having a first dog member mounted on a first shaft such that the first dog member is rotated together with the first shaft, and at least one second dog member each mounted to be axially adjacent to the first dog member and rotatable relative to the first shaft, first gears each mounted to be rotatable relative to the first shaft and provided with the second dog member, second gear which are mounted such that the second gears are rotated together with a second shaft parallel to the first shaft, and which mesh with the respective first gears, and a shifting mechanism for selectively placing each dog clutch in an engaged or released state. The control apparatus includes: a first calculating portion for detecting to a rotary angular position of the first shaft, and calculating a rotary angular position of the first dog member on the basis of the detected rotary angular position of the first shaft; a second calculating portion for detecting a rotary angular position of the second (Continued)

shaft, and calculating a rotary angular position of each second dog member on the basis of the detected rotary angular position of the second shaft; and an engagement control portion for controlling the shifting mechanism on the basis of the rotary angular positions of the first and second dog members, for engagement of the first and second dog members with each other.

8 Claims, 6 Drawing Sheets

(51) Int. Cl.
  *F16H 3/08* (2006.01)
  *F16H 61/04* (2006.01)
  *F16H 3/091* (2006.01)
  *F16H 61/68* (2006.01)
  *F16H 61/682* (2006.01)
(52) U.S. Cl.
  CPC ............ *F16H 3/0915* (2013.01); *F16H 59/68* (2013.01); *F16H 61/682* (2013.01); *F16H 2003/0811* (2013.01); *F16H 2061/047* (2013.01); *F16H 2061/0474* (2013.01); *F16H 2200/0047* (2013.01)
(58) Field of Classification Search
  USPC .......................................................... 74/335
  See application file for complete search history.

(56) References Cited

U.S. PATENT DOCUMENTS

| | | | | | |
|---|---|---|---|---|---|
| 4,964,313 | A | * | 10/1990 | Davis | ....................... F16D 11/10 192/48.91 |
| 5,022,506 | A | * | 6/1991 | Philippe | ................... F16D 23/06 192/53.32 |
| 5,078,244 | A | * | 1/1992 | Olson | ...................... F16D 23/06 192/53.332 |
| 5,111,922 | A | * | 5/1992 | Reynolds | ............ F16D 23/0606 192/53.331 |
| 5,161,423 | A | | 11/1992 | Ore | |
| 5,497,867 | A | | 3/1996 | Hirsch et al. | |
| 2015/0152960 | A1 | | 6/2015 | Haug et al. | |
| 2015/0377303 | A1 | | 12/2015 | Adachi et al. | |
| 2017/0045093 | A1 | | 2/2017 | Adachi et al. | |

FOREIGN PATENT DOCUMENTS

| | | |
|---|---|---|
| DE | 100 60 688 A1 | 6/2002 |
| DE | 10 2008 001 398 A1 | 10/2009 |
| DE | 10 2013 224 853 A1 | 6/2015 |
| DE | 11 2014 001 765 T5 | 12/2015 |
| EP | 2 789 878 A1 | 10/2014 |
| JP | 2014-206233 | 10/2014 |

* cited by examiner

CONTROL APPARATUS FOR VEHICULAR TRANSMISSION

INCORPORATION BY REFERENCE

The disclosure of Japanese Patent Application No. 2016-211125 filed on Oct. 27, 2016 including the specification, drawings and abstract is incorporated herein by reference in its entirety.

FIELD OF THE INVENTION

The present invention relates to a control apparatus for a transmission of a vehicle, which is provided with dog clutches.

BACKGROUND OF THE INVENTION

There is known a control apparatus for a vehicular transmission provided with a plurality of dog clutches. JP-2014-206233 A discloses an example of this type of vehicular transmission in the form of an automatic transmission 20 provided with a plurality of dog clutches C1-C6 each having movable dog members and stationary dog members. The publication identified above also discloses a control apparatus configured to permit engagement of the movable dog members with the stationary dog members, at a timing suitable to avoid tooth butting of the movable and stationary dog members against each other, on the basis of relative rotating speeds of the movable and stationary dog members.

By the way, the transmission disclosed in the above-identified publication is controlled to try to implement engagement of the movable dog members with the stationary dog members during a first run of the vehicle immediately after power application to a vehicular control system (ECU: Electronic Control Unit), at an arbitrary timing which does not necessarily permit the mutual engagement of the movable and stationary dog members, since relative rotary angular positions of the movable and stationary dog members are not known just after the power application. The adequate relative rotary angular positions in which the movable and stationary dog members are held in engagement with each other to permit power transmission between the movable and stationary dog members are stored in a memory by means of a learning control technique, as initial or zero positions, that is, as the rotary angular positions permitting the adequate mutual engagement of the movable and stationary dog members. In the process of the try to implement the mutual engagement of the movable and stationary dog members at the arbitrary timing, however, there is a risk of tooth butting or collision of the movable and stationary dog members against each other.

SUMMARY OF THE INVENTION

The present invention was made in view of the background art described above. It is therefore an object of the present invention to provide a control apparatus for a vehicular transmission provided with dog clutches each having first and second dog members, which control apparatus permits mutual engagement of the first and second dog members with a reduced risk of their tooth butting against each other.

The object indicated above is achieved according to the following modes of the present invention:

According to a first mode of the invention, there is provided a control apparatus for a vehicular transmission including (a) at least one dog clutch each having a first dog member mounted on a first shaft such that the first dog member is rotated together with the first shaft, and at least one second dog member each mounted to be axially adjacent to the first dog member and rotatable relative to the first shaft, (b) first gears each mounted to be rotatable relative to the first shaft and provided with the second dog member, (c) second gears which are mounted such that the second gears are rotated together with a second shaft parallel to the first shaft, and which mesh with the respective first gears, and (d) a shifting mechanism configured to selectively place each dog clutch in an engaged or released state, the control apparatus comprising: a first calculating portion configured to detect a rotary angular position of the first shaft, and to calculate a rotary angular position of the first dog member on the basis of the detected rotary angular position of the first shaft; a second calculating portion configured to detect a rotary angular position of the second shaft, and to calculate a rotary angular position of each second dog member on the basis of the detected rotary angular position of the second shaft; and an engagement control portion configured to control the shifting mechanism on the basis of the rotary angular positions of the first and second dog members, for engagement of the first and second dog members with each other.

According to a second mode of the invention, the transmission to be controlled by the control apparatus according to the first mode of the invention is configured such that the above-described at least one dog clutch consists of a plurality of dog clutches mounted on the first shaft.

According to a third mode of the invention, the transmission to be controlled by the control apparatus according to the first or second mode of the invention is configured such that the number of dog teeth of each of the first dog members and the number of dog teeth of each of the second dog members are determined to be equal to a reciprocal of a gear ratio of the first and second gears, or a multiple of the reciprocal.

According to a fourth mode of the invention, the transmission to be controlled by the control apparatus according to any one of the first through third modes of the invention is configured such that first shaft and the second shaft are provided with respective master splines.

Advantages of the Invention

According to the first mode of the invention, the first dog member is rotated together with the first shaft, so that the rotary angular position of the first dog member can be calculated on the rotary angular position of the first shaft. In addition, the second shaft is rotated together with the second gears which mesh with the respective first gears, so that the rotary angular position of each second dog member rotated together with the corresponding first gear can be calculated on the rotary angular position of the second shaft. Accordingly, the rotary angular positions of the first and second dog members can be calculated on the basis of the detected rotary angular positions of the first and second shafts, even when the detection of the rotary angular positions of the first and second shafts takes place immediately after power application to a vehicular control system including the control apparatus. Since the relative rotary angular position of the first and second dog members can be calculated immediately after the power application to the vehicular control system, the first and second dog members can be brought into engagement with each other, without tooth butting of the first and second dog members against each other.

According to the second mode of the invention, the plurality of dog clutches are mounted on the first shaft. In this mode of the invention, too, the rotary angular positions of the first and second dog members of each dog clutch can be calculated on the basis of the detected rotary angular positions of the first and second shafts, without a need of using rotary angle sensors for detecting the rotary angular positions of the first and second dog members for each of the plurality of dog clutches. Accordingly, the required number of the rotary angle sensors can be reduced.

According to the third mode of the invention, the number of dog teeth of each of the first dog members and the number of dog teeth of each of the second dog members are determined to be equal to a reciprocal of a gear ratio of the first and second gears, or a multiple of the reciprocal. Accordingly, the dog teeth of the second dog members have the same rotary angular phase each time the second gear is rotated by 360°, so that the rotary angular positions of the dog teeth of the second dog members can be calculated on the basis of the detected rotary angular position of the second shaft.

According to the fourth mode of the invention, the first shaft and the second shaft are provided with respective master splines, so that the first dog members, first gears and second gears can be mounted on the first and second shafts, at predetermined rotary angular positions with respect to the rotary angular position of the master splines which are used as reference positions. In addition, absolute rotary angular positions of the first and second shafts can be detected or determined on the basis of the rotary angular positions of these master splines.

DETAILED DESCRIPTION OF PREFERRED EMBODIMENT

Figure 1:
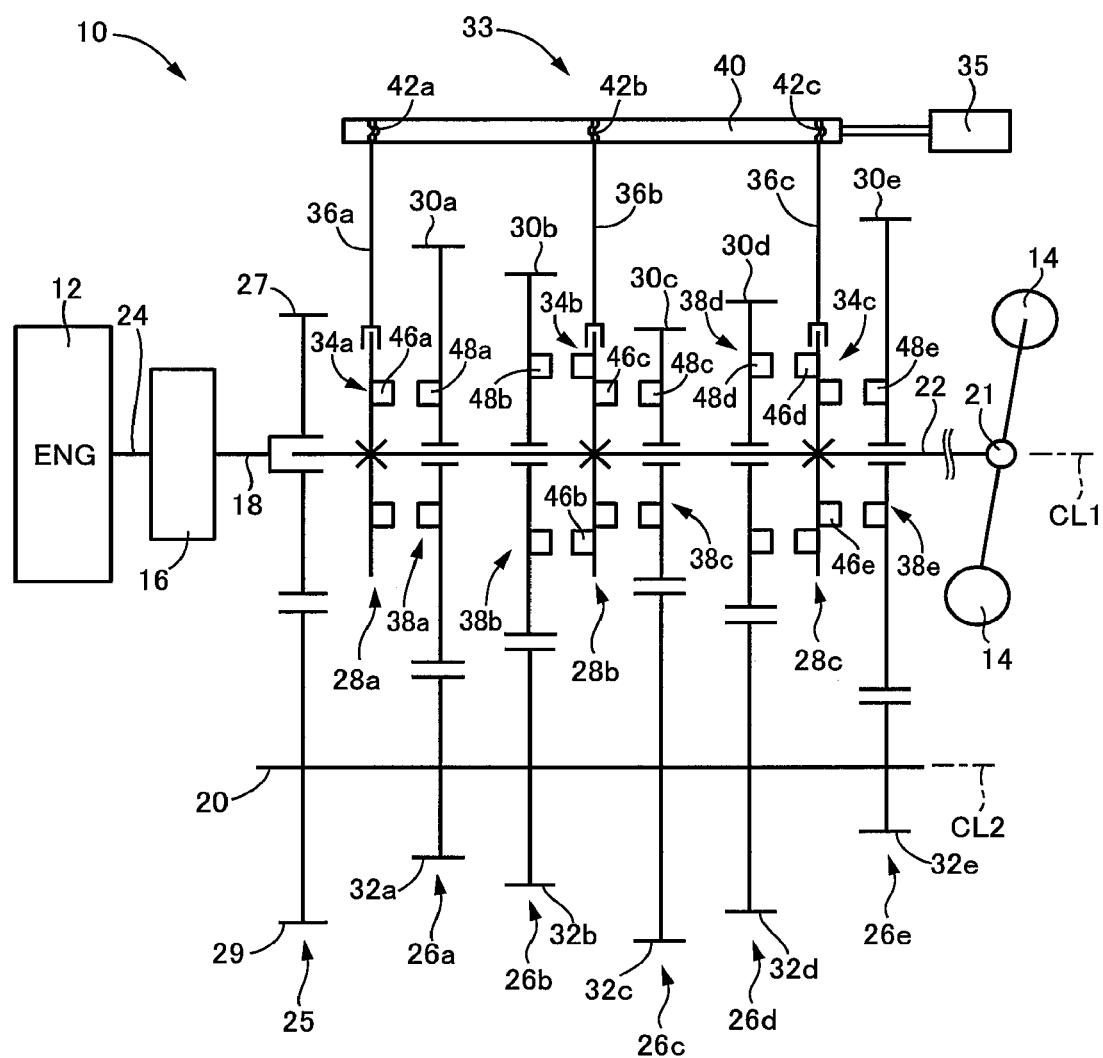
FIG. 1 is a schematic view showing an arrangement of a vehicular transmission to be controlled by a control apparatus according to the present invention.

Referring to the drawings, a preferred embodiment of the present invention will be described in detail. It is to be understood that the drawings are simplified and transformed as needed, and do not necessarily accurately represent the dimensions and shapes of various elements shown therein.

Reference is first made to FIG. 1, which is the schematic view showing an arrangement of a vehicular transmission 10 (hereinafter simply referred to as "transmission 10") to be controlled by a control apparatus according to the present invention. As shown in FIG. 1, the transmission 10 is disposed in a power transmitting path between an engine 12 and vehicle drive wheels 14, and is a parallel two-axes type transmission having a plurality of gear or speed positions, more specifically, five speed positions having respective different values of speed ratio i at which the speed of a rotary motion received from the engine 12 is reduced or raised.

The transmission 10 includes an input shaft 18 operatively connected to the engine 12 through a clutch 16, a counter shaft 20 disposed in parallel to the input shaft 18, and an output shaft 22 operatively connected to the drive wheels 14 through a differential mechanism 21. The input shaft 18 and the output shaft 22 are disposed to be concentric with an axis CL1 of a crankshaft 24 of the engine 12, while the counter shaft 20 is disposed on an axis CL2 parallel to the axis CL1. It is noted that the output shaft 22 and the counter shaft 20 respectively correspond to a first shaft and a second shaft of the transmission 10 to be controlled by the control apparatus according to this embodiment of the invention.

The transmission 10 further includes six gear pairs each consisting of a pair of mutually meshing gears. Described more specifically, the transmission 10 includes an input gear pair 25, a second speed gear pair 26a, a third speed gear pair 26b, a fifth speed gear pair 26c, a fourth speed gear pair 26d and a first speed gear pair 26e.

The input gear pair 25 consists of an input gear 27 fixed to the input shaft 18, and a counter gear 29 fixed to the counter shaft 20. A rotary motion of the input shaft 18 is transmitted to the counter shaft 20 through the input gear 27.

The second speed gear pair 26a consists of a second speed gear 30a mounted on the output shaft 22 rotatably relative to the output shaft 22, and a second speed counter gear 32a fixedly mounted on the counter shaft 20 such that the counter gear 32a is rotated together with the counter shaft 20. The second speed gear 30a and the second speed counter gear 32a are meshed with each other.

The third speed gear pair 26b consists of a third speed gear 30b mounted on the output shaft 22 rotatably relative to the output shaft 22, and a third speed counter gear 32b fixedly mounted on the counter shaft 20 such that the counter gear 32b is rotated together with the counter shaft 20. The third speed gear 30b and the third speed counter gear 32b are meshed with each other.

The fifth speed gear pair 26c consists of a fifth speed gear 30c mounted on the output shaft 22 rotatably relative to the output shaft 22, and a fifth speed counter gear 32c fixedly mounted on the counter shaft 20 such that the counter gear 32c is rotated together with the counter shaft 20. The fifth speed gear 30c and the fifth speed counter gear 32c are meshed with each other.

The fourth speed gear pair 26d consists of a fourth speed gear 30d mounted on the output shaft 22 rotatably relative to the output shaft 22, and a fourth speed counter gear 32d fixedly mounted on the counter shaft 20 such that the counter gear 32d is rotated together with the counter shaft 20. The fourth speed gear 30d and the fourth speed counter gear 32d are meshed with each other.

The first speed gear pair 26e consists of a first speed gear 30e mounted on the output shaft 22 rotatably relative to the output shaft 22, and a first speed counter gear 32e fixedly mounted on the counter shaft 20 such that the counter gear 32e is rotated together with the counter shaft 20. The first speed gear 30e and the first speed counter gear 32e are meshed with each other. The second through fifth and first speed gear pairs 26a-26e are hereinafter collectively referred to as "shift gear pairs 26", the second through fifth and first speed gears 30a-30e are hereinafter collectively referred to as "shift gears 30", while the second through fifth and first speed counter gears 32a-32e are hereinafter collectively referred to as "counter gears 32", unless otherwise specified. It is noted that the shift gears 30 correspond to first gears while the counter gears 32 correspond to second gears.

On the output shaft 22, there are mounted three dog clutches consisting of a first dog clutch 28a, a second dog clutch 28b and a third dog clutch 28c, and the above-described five shift gears 30a-30e.

The first dog clutch 28a is disposed between the input gear 27 and the second speed gear 30a in the direction of the axis CL1 of the output shaft 22. The first dog clutch 28a has a first dog member 34a in the form of a disc mounted on the output shaft 22 such that the first dog member 34a is rotated together with the output shaft 22 and is movable relative to the output shaft 22 in the direction of the axis CL1, and a second dog member 38a in the form of a disc which is formed integrally with the second speed gear 30a and which is rotatable relative to the output shaft 22. The first dog member 34a and the second dog member 38a are coaxially opposed to each other in the direction of the axis CL1.

The first dog member 34a has a plurality of dog teeth 46a formed on its surface opposed to the second speed gear 30a in the direction of the axis CL1, so as to protrude toward the second dog member 38a. The plurality of dog teeth 46a are equiangularly spaced apart from each other in the circumferential direction of the first dog member 34a. Similarly, the second dog member 38a has a plurality of dog teeth 48a formed on its surface opposed to the first dog member 34a in the direction of the axis CL1, so as to protrude toward the first dog member 34a. The plurality of dog teeth 48a are equiangularly spaced apart from each other in the circumferential direction of the second dog member 38a.

The dog teeth 46a and the dog teeth 48a are located so as to be engageable with each other. Accordingly, when the first dog member 34a of the first dog clutch 28a is moved toward the second speed gear 30a, namely, toward the second dog member 38a in the direction of the axis CL1 during running of the vehicle, the dog teeth 46a of the first dog member 34a and the dog teeth 48a of the second dog member 38a come into meshing engagement with each other, whereby the first dog member 34a and the second dog member 38a are brought into engagement with each other. As a result, the second speed gear 30a is operatively connected to the output shaft 22 through the first dog clutch 28a thus placed in its engaged state, so that the counter shaft 20 is operatively connected to the output shaft 22 through the second speed gear pair 26a, whereby the transmission 10 is shifted to a second speed position.

The second dog clutch 28b is disposed between the third speed gear 30b and the fifth speed gear 30c in the direction of the axis CL1 of the output shaft 22. The second dog clutch 28b has a first dog member 34b in the form of a disc mounted on the output shaft 22 such that the first dog member 34b is rotated together with the output shaft 22 and is movable relative to the output shaft 22 in the direction of the axis CL1, a second dog member 38b in the form of a disc which is formed integrally with the third speed gear 30b and which is rotatable relative to the output shaft 22, and a second dog member 38c in the form of a disc which is formed integrally with the fifth speed gear 30c and which is rotatable relative to the output shaft 22. The first dog member 34b and the second dog member 38b are coaxially opposed to each other in the direction of the axis CL1, while the first dog member 34b and the second dog member 38c are coaxially opposed to each other in the direction of the axis CL1. Namely, the first dog member 34b is interposed between the second dog member 38b and the second dog member 38c in the direction of the axis CL1.

The first dog member 34b has a plurality of dog teeth 46b formed on its surface opposed to the third speed gear 30b in the direction of the axis CL1, so as to protrude toward the third speed gear 30b. The plurality of dog teeth 46b are equiangularly spaced apart from each other in the circumferential direction of the first dog member 34b. Further, the first dog member 34b has a plurality of dog teeth 46c formed on its surface opposed to the fifth speed gear 30c in the direction of the axis CL1, so as to protrude toward the fifth speed gear 30c. The plurality of dog teeth 46c are equiangularly spaced apart from each other in the circumferential direction of the first dog member 34b. Similarly, the second dog member 38b has a plurality of dog teeth 48b formed on its surface opposed to the first dog member 34b in the direction of the axis CL1, so as to protrude toward the first dog member 34b. The dog teeth 48b are equiangularly spaced apart from each other in the circumferential direction of the second dog member 38b, so as to be engageable with the dog teeth 46b. The second dog member 38c has a plurality of dog teeth 48c on its surface opposed to the first dog member 34b in the direction of the axis CL1, so as to protrude toward the first dog member 34b. The dog teeth 48c are equiangularly spaced apart from each other in the circumferential direction of the second dog member 38c, so as to be engageable with the dog teeth 46c.

Accordingly, when the first dog member 34b of the second dog clutch 28b is moved toward the third speed gear 30b, namely, toward the second dog member 38b in the direction of the axis CL1 during running of the vehicle, the dog teeth 46b of the first dog member 34b and the dog teeth 48b of the second dog member 38b come into meshing engagement with each other, whereby the first dog member 34b and the second dog member 38b are brought into engagement with each other. As a result, the third speed gear 30b is operatively connected to the output shaft 22 through the second dog clutch 28b thus placed in its engaged state, so that the counter shaft 20 is operatively connected to the output shaft 22 through the third speed gear pair 26b, whereby the transmission 10 is shifted to a third speed position.

When the first dog member 34b of the second dog clutch 28b is moved toward the fifth speed gear 30c, namely, toward the second dog member 38c in the direction of the axis CL1 during running of the vehicle, the dog teeth 46c of the first dog member 34b and the dog teeth 48c of the second dog member 38c come into meshing engagement with each other, whereby the first dog member 34b and the second dog member 38c are brought into engagement with each other. As a result, the fifth speed gear 30c is operatively connected to the output shaft 22 through the second dog clutch 28b thus placed in its engaged state, so that the counter shaft 20 is operatively connected to the output shaft 22 through the fifth speed gear pair 26c, whereby the transmission 10 is shifted to a fifth speed position.

The third dog clutch 28c is disposed between the fourth speed gear 30d and the first speed gear 30e in the direction of the axis CL1 of the output shaft 22. The third dog clutch 28c has a first dog member 34c in the form of a disc mounted on the output shaft 22 such that the first dog member 34c is rotated together with the output shaft 22 and is movable relative to the output shaft 22 in the direction of the axis CL1, a second dog member 38d in the form of a disc which is formed integrally with the fourth speed gear 30d and which is rotatable relative to the output shaft 22, and a second dog member 38e in the form of a disc which is formed integrally with the first speed gear 30e and which is rotatable relative to the output shaft 22. The first dog member 34c and the second dog member 38d are coaxially opposed to each other in the direction of the axis CL1, while the first dog member 34c and the second dog member 38e are coaxially opposed to each other in the direction of the axis CL1. Namely, the first dog member 34c is interposed between the second dog member 38d and the second dog member 38e in the direction of the axis CL1.

The first dog member 34c has a plurality of dog teeth 46d formed on its surface opposed to the fourth speed gear 30d in the direction of the axis CL1, so as to protrude toward the fourth peed gear 30d. The plurality of dog teeth 46d are equiangularly spaced apart from each other in the circumferential direction of the first dog member 34c. Further, the first dog member 34c has a plurality of dog teeth 46e formed on its surface opposed to the first speed gear 30e in the direction of the axis CL1, so as to protrude toward the first speed gear 30e. The plurality of dog teeth 46e are equiangularly spaced apart from each other in the circumferential direction of the first dog member 34c. Similarly, the second dog member 38d has a plurality of dog teeth 48d formed on its surface opposed to the first dog member 34c in the direction of the axis CL1, so as to protrude toward the first dog member 34c. The dog teeth 48d are equiangularly spaced apart from each other in the circumferential direction of the second dog member 38d, so as to be engageable with the dog teeth 46d. The second dog member 38e has a plurality of dog teeth 48e on its surface opposed to the first dog member 34c in the direction of the axis CL1, so as to protrude toward the first dog member 34c. The dog teeth 48e are equiangularly spaced apart from each other in the circumferential direction of the second dog member 38e, so as to be engageable with the dog teeth 46e.

Accordingly, when the first dog member 34c of the third dog clutch 28c is moved toward the fourth speed gear 30d, namely, toward the second dog member 38d in the direction of the axis CL1 during running of the vehicle, the dog teeth 46d of the first dog member 34c and the dog teeth 48d of the second dog member 38d come into meshing engagement with each other, whereby the first dog member 34c and the second dog member 38d are brought into engagement with each other. As a result, the fourth speed gear 30d is operatively connected to the output shaft 22 through the third dog clutch 28c thus placed in its engaged state, so that the counter shaft 20 is operatively connected to the output shaft 22 through the fourth speed gear pair 26d, whereby the transmission 10 is shifted to a fourth speed position.

When the first dog member 34c of the third dog clutch 28c is moved toward the first speed gear 30e, namely, toward the second dog member 38e in the direction of the axis CL1 during running of the vehicle, the dog teeth 46e of the first dog member 34c and the dog teeth 48e of the second dog member 38e come into meshing engagement with each other, whereby the first dog member 34c and the second dog member 38e are brought into engagement with each other. As a result, the first speed gear 30e is operatively connected to the output shaft 22 through the third dog clutch 28c thus placed in its engaged state, so that the counter shaft 20 is operatively connected to the output shaft 22 through the first speed gear pair 26e, whereby the transmission 10 is shifted to a first speed position. The first through third dog clutches 28a-28c are hereinafter collectively referred to as "dog clutches 28", the first dog members 34a-34c are hereinafter collectively referred to as "first dog members 34", while the second dog members 38a-38e are hereinafter collectively referred to as "second dog members 38", unless otherwise specified. Further, the dog teeth 46a-46e of the first dog members 34 are hereinafter referred to as "dog teeth 46" while the dog teeth 48a-48e of the second dog members 38 are hereinafter referred to as "dog teeth 48", unless otherwise specified.

The first dog members 34 of the dog clutches 28 are moved in the direction of the axis CL1 by a shifting mechanism 33. The shifting mechanism 33 includes an actuator 35, a shift fork 36a held in engagement with the first dog member 34a of the first dog clutch 28a, a shift fork 36b held in engagement with the first dog member 34b of the second dog clutch 28b, a shift fork 36c held in engagement with the first dog member 34c of the third dog clutch 28c, and a shifting shaft 40 to be rotated by the actuator 35.

The shifting shaft 40 has shifting grooves 42a, 42b and 42c formed in its outer circumferential surface. The shifting grooves 42a, 42b and 42c are held in engagement with the respective shift forks 36a, 36b and 36c. The shifting grooves 42a-42c are formed to have respective different shapes. Described more specifically, the shifting grooves 42a-42c are configured to sequentially place the dog clutches 28 selectively in the engaged and released states, to sequentially shift up the transmission 10 from the first speed position toward the fifth speed position in this order of description when the shifting shaft 40 is rotated in one of opposite directions. In other words, the shifting grooves 42a-42c are configured to sequentially place the dog clutches 28 selectively in the engaged and released states, to sequentially shift down the transmission 10 from the fifth speed position toward the first speed position in this order of description when the shifting shaft 40 is rotated in the other direction. A selected one of the first through fifth speed positions is established by implementing an engaging action of a selected one of the dog clutches which corresponds to the selected speed position to be established, and implementing a releasing action of another dog clutch which corresponds to the speed position from which the transmission 10 is shifted to the selected speed position.

The shifting shaft 40 has predetermined five angular positions at which the five speed positions are established respectively. When a determination to shift the transmission 10 to a selected one of the five speed positions is made, the shifting shaft 40 is rotated by the actuator 35 to one of the predetermined angular positions which corresponds to the selected speed position to which the transmission 10 is to be shifted. Accordingly, the transmission 10 is shifted to the selected speed position with appropriate engaging and releasing actions of the dog clutches 28. At this time, the timing of operation and the operating speed of the actuator 35 are controlled so as to prevent so-called "dog tooth butting" (tooth butting) which is abutting contact between the end faces of the dog teeth 46 of the first dog members 34 and the end faces of the dog teeth 48 of the second dog members 38 in the direction of the axis CL1 in a transition period of engaging. Thus, the transmission 10 is shifted to the selected speed position with the selective engaging and releasing actions of the dog clutches 28 by the operation of the shifting mechanism 33.

By the way, the relative rotary angular positions of the dog teeth 46 and dog teeth 48 should be known to permit the engagement of the dog teeth 46 and the dog teeth 48 with each other without a risk of mutual butting of the dog teeth 46 and dog teeth 48 in the process of the mutual engaging actions of the dog teeth 46 and dog teeth 48. In the prior art in which the relative rotary angular positions of the dog teeth of the first dog member and the dog teeth of the second dog member are not known just after power application to the vehicular control system, the vehicular control system is configured to try to implement engagement of the dog teeth of the first dog member and the dog teeth of the second dog member with each other for establishing a selected speed position of the transmission during a first run of the vehicle immediately after power application to the vehicular control system, at an arbitrary timing which does not necessarily permit the mutual engagement of the dog teeth of the first and second dog members. The relative rotary angular positions in which the dog teeth of the first and second dog members are held in engagement with each other are stored in a memory by means of a learning control, as initial or zero positions, that is, as the rotary angular positions permitting the adequate mutual engagement of the dog teeth of the first and second dog members. In the process of the try to implement the mutual engagement of the dog teeth of the first and second dog members at the arbitrary timing, however, there is a risk of tooth butting or collision of the dog teeth of the first and second dog members against each other.

The present embodiment is configured to calculate the rotary angular positions of the dog teeth 46 of the first dog members 34 and the angular positions of the dog teeth 48 of the second dog members 38 just after the power application to the vehicular control system, in order to reduce the risk of butting of the dog teeth 46 of the first dog member 34 and the dog teeth 48 of the second dog member 38 against each other just after the power application. There will be described devices and the vehicular control system for reducing the risk of butting of the dog teeth 46 and 48 against each other.

Figure 2:
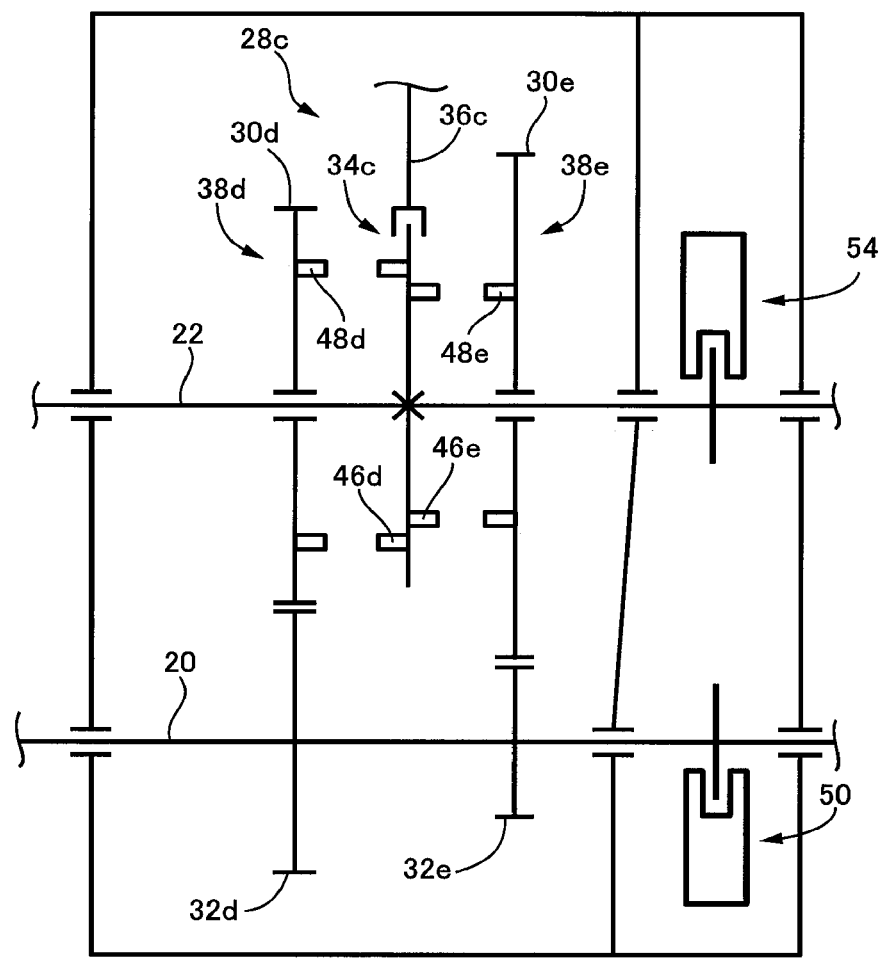
FIG. 2 is a schematic view showing one of a plurality of dog clutches shown in the schematic view of FIG. 1.

FIG. 2 is the schematic view showing one of the dog clutches 28 shown in the schematic view of FIG. 1, namely, the dog clutch 28c. As shown in FIG. 2, a rotary angle sensor 50 is provided to detect a rotary angular position of the counter shaft 20, while a rotary angle sensor 54 is provided to detect a rotary angular position of the output shaft 22.

In the present embodiment, the rotary angle sensors 50 and 54 are optical type absolute rotary encoders capable of detecting absolute rotary angular positions of the respective counter shaft 20 and the output shaft 22. Each of the absolute rotary encoders includes a disc having a multiplicity of slits, a light-emitting element, and a photosensitive element. The disc is fixed to the counter shaft 20 or the output shaft 22. The photosensitive element receives a light beam emitted from the light-emitting element and transmitted through the slits of the disc. The light beams received by the photosensitive element as optical signals are converted into electric signals, and the rotary angular position of the counter shaft 20 or the output shaft 22 is detected on the basis of the electric signals. The geometries of the slits of each of the discs of the absolute rotary encoders irregularly vary in the circumferential direction of the disc, and the detected optical signals accordingly vary according to the rotary angular position of the counter shaft 20 or the output shaft 22 and the absolute rotary encoders recognize relation between the optical signals and corresponding absolute rotary angular positions, so that the absolute rotary angular positions of the counter and output shafts 20, 22 can be detected on the basis of the optical signals received by the absolute rotary encoders, not only during the power application to the vehicular control system, but also immediately after the power application.

Figure 3:
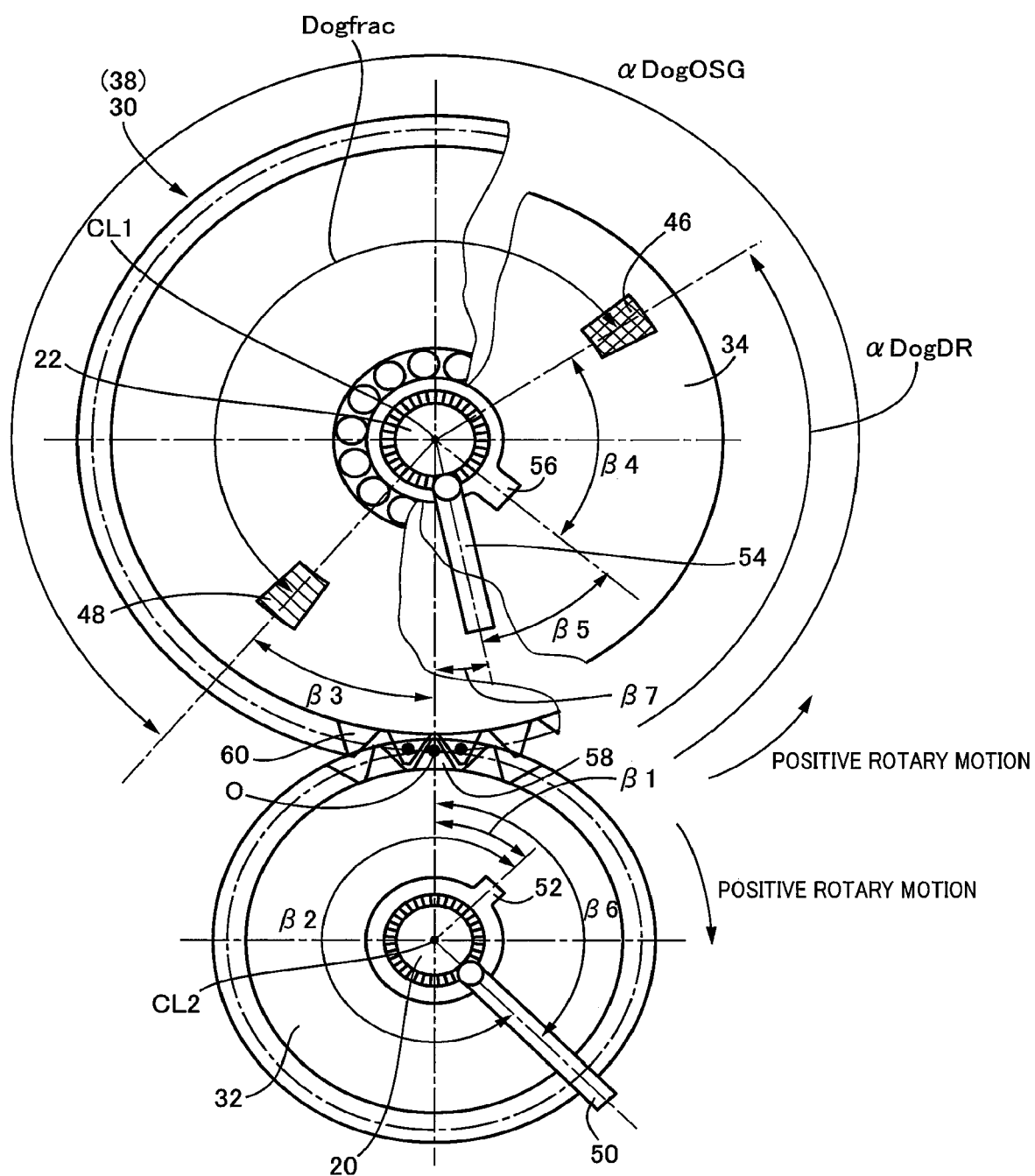
FIG. 3 is a view as seen in an axial direction of the transmission, showing a first dog member, a second dog member engageable with the first dog member, a shift gear formed integrally with the second dog member, and a counter gear meshing with the shift gear, which are shown in FIG. 2.

FIG. 3 is the view as seen in the direction of the axis CL1, showing one of the shift gears 30 (of the second dog members 38), the corresponding one of the counter gears 32, and the corresponding one of the first dog members 34.

As shown in FIG. 3, the counter gear 32 is fixedly mounted on the counter shaft 20 having the axis CL2, such that the counter gear 32 is rotated together with the counter shaft 20, while the shift gear 30 meshing with the counter gear 32 is mounted on the output shaft 22 having the axis CL1, such that the shift gear 30 is rotatable relative to the output shaft 22. Further, the first dog member 34 is mounted on the output shaft 22 such that the first dog member 34 is rotated together with the output shaft 22 and is movable relative to the output shaft 22 in the direction of the axis CL1.

The shift gear 30 is provided with the integrally formed second dog member 38 having the dog teeth 48. It is noted that FIG. 3 shows only one of the plurality of dog teeth 48 which are equiangularly spaced apart from each other in the circumferential direction of the shift gear 30 (second dog member 38). Further, the first dog member 34 is provided with the integrally formed dog teeth 46. It is also noted that FIG. 3 shows only one of the plurality of dog teeth 46 which are equiangularly spaced apart from each other in the circumferential direction of the first dog member 34.

The counter shaft 20 and the output shaft 22 have respective master splines 52 and 56, which are used as reference rotary angular positions of the first dog member 34, the shift gear 30 (second dog member 38) and the counter gear 32, for assembling these first dog member 34, shift gear 30 and counter gear 32 at their predetermined rotary angular positions as indicated in FIG. 3 by way of example.

There will be described angles β1-β7 indicated in FIG. 3. A rotary motion of the counter shaft 20 in the clockwise direction and a rotary motion of the shift gear 30 in the counterclockwise direction as seen in FIG. 3 cause forward running of the vehicle and are referred to as "positive rotary motions".

In FIG. 3, "β1" represents an angle between a predetermined one of teeth 58 of the counter gear 32, and the master spline 52 provided on the counter shaft 20, and "β2" represents an angle between the master spline 52 and a reference angular position (zero position) which is the rotary angular position of the rotary angle sensor 50. "β3" represents an angle between the dog tooth 48 of the shift gear 30 and a midpoint between predetermined two adjacent ones of teeth 60 of the shift gear 30 meshing with the teeth 58 of the counter gear 32, and "β4" represents an angle between the master spline 56 provided on the output shaft 22 and the dog tooth 46. "β5" represents an angle between the master spline 56 and a reference angular position (zero position) which is the rotary angular position of the rotary angle sensor 54. "β6" represents an angle between the rotary angular position of the rotary angle sensor 50 and a point O of mutual meshing of the teeth 58 and the teeth 60. "β7" represents an angle between the rotary angular position of the rotary angle sensor 54 and the point O of mutual meshing of the teeth 58 and 60. The angle "β2" corresponds to an output of the rotary angle sensor 50 while "β5" corresponds to an output of the rotary angle sensor 54. The angles β1, β3, β4, β6 and β7 are predetermined values of design of the transmission 10. It is noted that the above-indicated point O of mutual meshing of the teeth 58 and 60, which actually varies within a certain range of angle, is represented by a midpoint of this range (a point on a straight line connecting the axis CL1 of the output shaft 22 and the axis CL2 of the counter shaft 20).

The relative rotary angular positions of the dog teeth 46 and the dog teeth 48 are calculated on the basis of the above-described angles β1-β7, and according to the following equations (1)-(4). "Dogfrac" in the equation (1) is a standardized value which represents the relative rotary angular positions of the dog teeth 46 and 48 and which is held within a range of 0~1.0. Where Dogfrac is equal to 0 or 1.0, the dog teeth 46 and the dog teeth 48 have the same rotary angular position. Where the Dogfrac is not equal to 0 or 1.0, the dog teeth 46 and the dog teeth 48 have respective different rotary angular positions. Where Dogfrac is held within a predetermined range, the dog teeth 46 and the dog teeth 48 are completely spaced apart from each other in the direction of their rotation. It is possible to reduce or avoid the risk of butting of the dog teeth 46 and the dog teeth 48 against each other during engaging actions of the dog clutches 28, by controlling the operation of the actuator 35 according to the relative rotary angular positions of the dog teeth 46 and 48 detected on the basis of the value Dogfrac.

"#dogs" in the equation (1) represents the number of the dog teeth 46 and 48. In the present embodiment, the number of the dog teeth 46 and the number of the dog teeth 48 are equal to each other. The number of the dog teeth 46 and the number of the dog teeth 48 are set for each speed gear to be different each other. Further, "Δα" represents an angle of relative rotation of the dog teeth 46 and 48. The equation (2) is an equation to calculate the value "Δα" in the equation (1). "αDogOSG" in the equation (2) represents a rotary angular position (an angle of rotation) of the dog teeth 48 of the second dog member 38 with respect to the above-described point O of mutual meshing of the teeth 58 and 60, while "αDogDR" in the equation (2) represents a rotary angular position (an angle of rotation) of the dog teeth 46 of the first dog member 34 with respect to the above-described point O of mutual meshing of the teeth 58 and 60. The equation (3) is an equation to calculate the value "αDogOSG" in the equation (2). In the equation (3), "i" corresponds to the gear ratio of the shift gear 30 and the counter gear 32 with respect to each other when the transmission 10 is shifted to a selected one of the speed positions. The equation (4) is an equation to calculate the value "αDogDR" in the equation (2).

$$\text{Dog}frac=(\#\text{dogs}/360)\times\{\Delta\alpha \text{modulo}(360/\#\text{dogs})\} \quad (1)$$

$$\Delta\alpha=\alpha\text{Dog}OSG-\alpha\text{Dog}DR \quad (2)$$

$$\alpha\text{Dog}OSG=\{(\beta6+\beta2-\beta1)\times i\}-\beta3 \quad (3)$$

$$\alpha\text{Dog}DR=\beta7+\beta5+\beta4 \quad (4)$$

Figure 4:
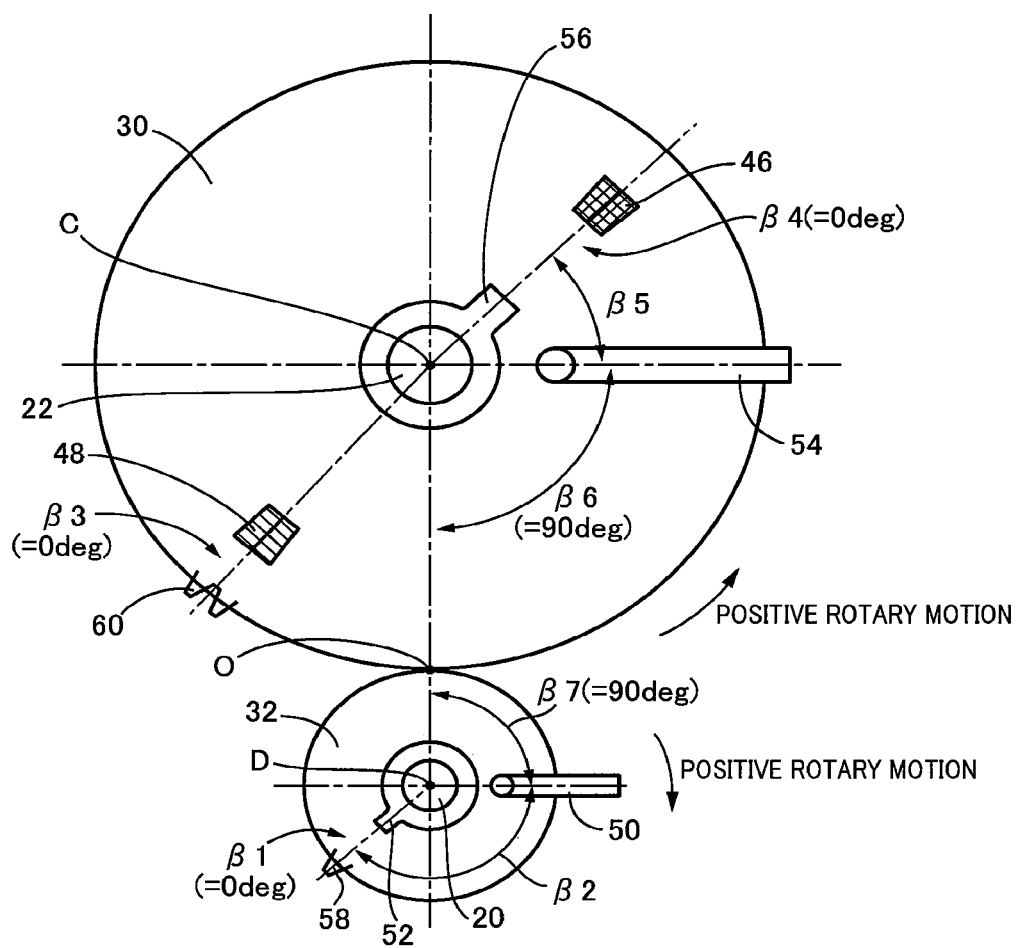
FIG. 4 is a view showing an example of arrangement of dog tooth, the shift gear, the counter gear, and rotary angle sensors.

The calculation of the value Dogfrac will be described in detail. In the present specific example, the angles β1, β3 and β4 are 0°, while the angles β6 and β7 are 90°. FIG. 4 illustrates this specific example. Although FIG. 4 shows the dog tooth 46 as if the dog tooth 46 was provided on the shift gear 30, the first dog member 34 is actually provided on the first dog member 34, and the dog tooth 46 is rotated relative to the dog tooth 48.

In the example of FIG. 4, the above-indicated predetermined tooth 58 of the counter gear 32 is located at the rotary angular position of the master spline 52, so that the angle β1 is 0°, and the midpoint between the above-indicated predetermined two adjacent teeth 60 of the shift gear 30 is located at the rotary angular position of the dog tooth 48, so that the angle β3 is 0°. Further, the dog tooth 46 of the first dog member 34 is located at the rotary angular position of the master spline 56, so that the angle β4 is 0°, and the rotary angle sensor 54 is located at an angular position which is 90° spaced apart from the point O of mutual meshing of the teeth 58 and 60, so that the angle β6 is 90°. The rotary angle sensor 50 is located at an angular position which is 90° spaced apart from the point O of mutual meshing of the teeth 58 and 60, so that the angle β7 is 90°.

In the specific example of FIG. 4, the value αDogOSG is calculated according to the following equation (5) by application of the equation (3), and the value αDogDR is calculated according to the following equation (6) by application of the equation (4). The rotary angular position (angle of rotation) of the dog tooth 48 of the shift gear 30 with respect to the point O of mutual meshing of the teeth 58 and 60 is calculated according to the equation (5) by multiplying the angle between the point O of mutual meshing and the master spline 52 by the gear ratio i. On the other hand, according to the equation (6), the rotary angular position (angle of rotation) of the dog tooth 46 of the first dog member 34 with respect to the point O of mutual meshing is calculated by adding the angle β5 represented by the output of the rotary angle sensor 50 to the angle (i.e. 90°) between the rotary angular position of the rotary angle sensor 54 and the point O of mutual meshing.

$$\alpha\text{Dog}OSG=(90+\beta2)\times i \quad (5)$$

$$\alpha\text{Dog}DR=90+\beta5 \quad (6)$$

Figure 5:
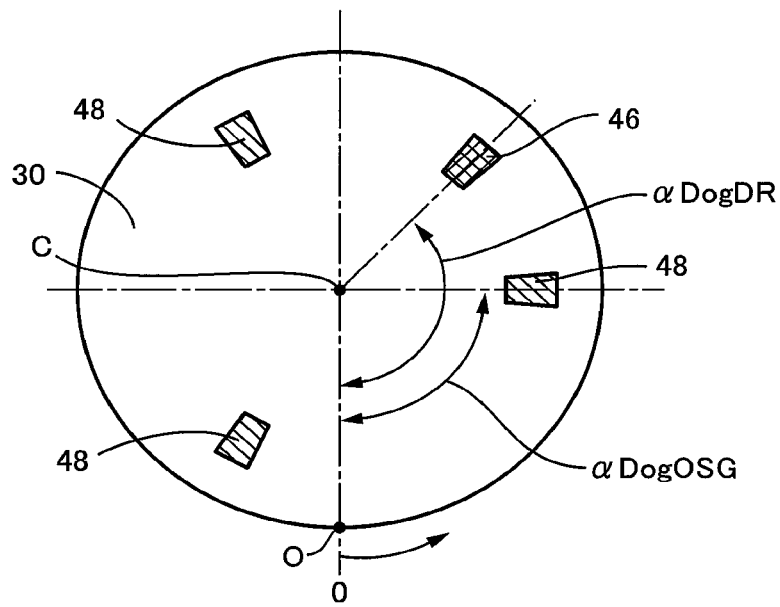
FIG. 5 is a view indicating relative rotary angular positions of the dog teeth where the counter gear and the shift gear have a gear ratio of 1/3 and where the number of the dog teeth provided on each of the first dog member and the shift gear is 3.

The number #dogs of the dog teeth 46 and 48 is determined as described below. Described more specifically, the number #dogs is determined to be equal to a reciprocal of the gear ratio i or a multiple of the reciprocal (as well as to be an integer). Where the shift gear 30 has 30 teeth 60 while the counter gear 32 has 10 teeth 58, for example, the gear ratio i is obtained as 10/30=1/3. Therefore, the reciprocal of the gear ratio i is equal to 3, so that the number #dogs of the dog teeth 46 and 48 is determined to be one of the multiples of 3, namely, 3, 6, 9, etc. With the number #dogs of the dog teeth 46 and 48 being thus determined, the dog teeth 48 provided on the shift gear 30 have the same rotary angular phase each time the counter gear 32 is rotated by 360°, and the same rotary angular positions at a given angular position of the counter gear 32. Accordingly, the rotary angular positions of the dog teeth 48 provided on the shift gear 30 can be calculated on the basis of the detected rotary angular position of the counter shaft 20 and according to the equation (5). FIG. 5 is the view indicating the relative rotary angular positions of the dog teeth 46 and 48 where the shift gear 30 and the counter gear 32 have the gear ratio i of 1/3 and where the number #dogs of the dog teeth 46 and 48 is equal to 3. The value Δα calculated according to the equation (2) is equal to a difference between the rotary angular position (angle of rotation) of the dog teeth 48 and the rotary angular position (angle of rotation) of the dog teeth 46.

Figure 6:
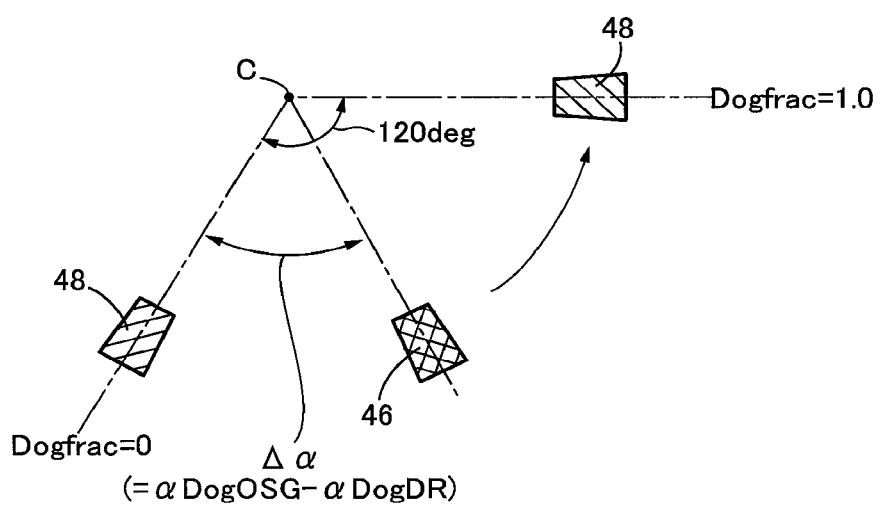
FIG. 6 is a view illustrating the relative rotary angular positions of the dog teeth shown in FIG. 5.

In the present example wherein the number #dogs of the dog teeth 46, 48 is equal to 3, the value (360/#dogs) included in the equation (1) is equal to 120. Further, the value Δαmodulo(360/#dogs) also included in the equation (1) is equal to a residual left after division of Δα by 120, and is therefore always held within a range of 0~120. The value Dogfrac is obtained by dividing the residual by 120 and is held within the range of 0~1.0. As shown in FIG. 6, the rotary angular positions of the dog teeth 46 and those of the dog teeth 48 are completely coincident with each other where the value Dogfrac is equal to 0 or 1.0. The value Dogfrac comes close to 0 or 1.0 as the dog teeth 48 are rotated toward the dog teeth 46. Thus, the value Dogfrac is the standardized value representing the relative rotary angular positions (relative angles of rotation) of the dog teeth 46 and 48.

As described above, the relative rotary angular positions of the dog teeth 46 and 48 are obtained by calculating the value Dogfrac as described above. The number #dogs of the dog teeth 46 and 48 is required to be optimally determined for the respective speed positions of the transmission 10. If the number #dogs is smaller than an optimum value, a torque applied to each dog teeth 46, 48 is excessively large, and the dog teeth 46 and 48 may have an insufficient degree of durability. If the number #dogs is larger than the optimum value, on the other hand, an amount of play between the dog teeth 46 and the dog teeth 48 tends to be small, so that there is a relatively high risk of butting of the dog teeth 46 and 48 against each other during their engaging actions. Therefore, the number #dogs is required to be determined within a predetermined permissible range. Further, the number #dogs is required to be equal to the reciprocal of the gear ratio i or a multiple of the reciprocal, so that the number #dogs should be determined by taking account of the numbers of the teeth 58 and the teeth 60, which determine the gear ratio i.

The desired gear ratio i can be established by one of a plurality of combinations of the number of the teeth 60 of the shift gear 30 and the teeth 58 of the counter gear 32. In this respect, it is noted that the desired gear ratio i may be determined within a predetermined permissible range, so that the combination of the numbers of the teeth 58 and 60 may be determined as long as the gear ratio i falls within this permissible range. Further, each of the numbers of the teeth 58 and 60 has permissible smallest and largest values of design, so that the combination is required to be determined such that the numbers fall with permissible ranges between the permissible smallest and largest values. Practically, the number #dogs of the dog teeth 46 and 48 is obtained for each of the combinations of the numbers of the teeth 58 and 60 for establishing the desired gear ratio i, and the numbers of the teeth 58 and 60 are selected so as to optimize the number #dogs of the dog teeth 46 and 48.

Some specific examples of determinations of the number #dogs of the dog teeth 46 and 48 and the numbers of the teeth 58 and 60 will be described in detail. Where the gear ratio i is 0.444, for example, combinations of the numbers of the teeth 58 and 60 available to establish this gear ratio i include (9, 4), (27, 12) and (36, 16), for instance. The left number in each of the parentheses is the number of the teeth 60 of the shift gear 30 while the right number in the parenthesis is the number of the teeth 58 of the counter gear 32. The combination (9, 4) is excluded since these numbers of the teeth 58 and 60 are smaller than required according to design restrictions. In the case of the combination (27, 12), the reciprocal of the gear ratio i is equal to 9/4, which is a ratio of the number of the teeth 60 of the shift gear 30 to the number of the teeth 58 of the counter gear 32. In this case, the number #dogs of the dog teeth 46 and 48 which should be an integer may be a smallest one of the multiples of (9/4), which is 9. Where the permissible range of the number #dogs is 3~15, the above-indicated combination (27, 12) can be employed. In the case of the combination (36, 16), too, the number #dogs may be 9, and this combination can also be employed. Accordingly, one of these combinations of the numbers of the teeth 58 and 60 for establishing the desired gear ratio i, which permits the numbers #dogs to fall within the permissible range, is selected so as to satisfy any other design requirements.

On the other hand, a combination (29, 13) of the numbers of the teeth 58 and 60 is an example which establishes the gear ratio i close to the target value 0.444, namely, establishes the gear ratio i of 0.448. In this case, the reciprocal of the gear ratio i is equal to (29/13), and the smallest integer of the multiples of (29/13) is 29. However, this number 29 which is outside the permissible range of 3~15 of the number #dogs cannot be employed.

As described above, the combinations of the numbers of the teeth 58 and 60 which can establish the desired gear ratio i and which permit the number #dogs of the dog teeth 46 and 48 to fall within the permissible range are obtained for each of the speed positions of the transmission 10, and one of the combinations of the numbers of the teeth 58 and 60 and the number #dogs are selected for the speed position to be established.

Figure 7:
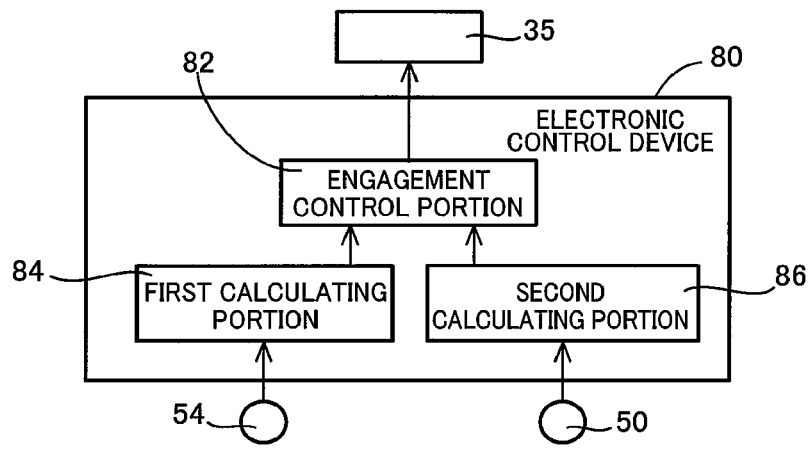
FIG. 7 is a functional block diagram showing functional portions of an electronic control device provided to control shifting actions of the transmission.

FIG. 7 is the functional block diagram showing functional portions of the control apparatus in the form of an electronic control device 80 provided to control the shifting actions of the transmission 10 wherein the numbers of the teeth 58 of the counter gears 32 and the teeth 60 of the shift gears 30, and the number #dogs of the dog teeth 46 and 48 are determined as described above.

The electronic control device 80 is configured to receive an output signal of the rotary angle sensor 50 indicative of the rotary angular position of the counter shaft 20, more specifically, the rotary angular position of the master spline 52 (namely, the angle β2), and an output signal of the rotary angle sensor 54 indicative of the rotary angular position of the output shaft 22, more specifically, the rotary angular position of the master spline 56 (namely, the angle β5). The electronic control device 80 is further configured to generate a drive signal to be applied to the actuator 35 for rotating the shifting shaft 40 to a predetermined rotary angular position for establishing the selected speed position of the transmission 10. The electronic control device 80 calculates a rotating speed of the counter shaft 20 on the basis of an angle of its rotation per unit time, and a rotating speed of the output shaft 22 on the basis of an angle of its rotation per unit time.

The electronic control device 80 includes an engagement control portion 82 (engagement control means), a first calculating portion 84 (first calculating means) and a second calculating portion 86 (second calculating means).

Upon determination to shift the transmission 10 to a selected one of the speed positions, the engagement control portion 82 commands the actuator 35 for rotating the shifting shaft 40 to a predetermined rotary angular position corresponding to the selected speed position. As a result of the rotary motion of the shifting shaft 40 by the actuator 35, the first dog member 34 corresponding to the selected speed position is moved by the shift fork 36 in the direction of the axis CL1 toward the second dog member 38 corresponding to the selected speed position, so that the dog teeth 46 of the first dog member 34 are brought into engagement with the dog teeth 48 of the second dog member 38, whereby these first and second dog members 34 and 38 are brought into engagement with each other to shift the transmission 10 to the selected speed position. Concurrently with the engaging action of these first and second dog members 34 and 38 to establish the selected speed positions, the rotary motion of the shifting shaft 40 causes a releasing action of the first and second dog members 34 and 38 which were placed in engagement with each other prior to the shifting action of the transmission 10 to the presently selected speed position.

To reduce the risk of butting of the dog teeth 46 of the first dog member 34 and the dog teeth 48 of the second dog member 38 against each other during the engaging action of these dog teeth 46 and 48 (during the shifting action of the transmission 10 to the selected speed position), it is necessary to detect the relative rotary angular positions of the dog teeth 46 and 48 during their engaging action. For this purpose, the first calculating portion 84 is configured to calculate the rotary angular positions (angles of rotation) of the dog teeth 46 of the first dog member 34 on the basis of the detected rotary angular position (angle of rotation) of the output shaft 22. Described more specifically, the first calculating portion 84 calculates the angles αDogDR corresponding to the rotary angular positions (angles of rotation) of the dog teeth 46 of the first dog member 34 with respect to the point O of mutual meshing of the teeth 58 and 60, according to the equation (4) given above.

The second calculating portion 86 is configured to calculate the rotary angular positions (angles of rotation) of the dog teeth 48 of the second dog member 38 on the basis of the detected rotary angular position (angle of rotation) of the counter shaft 20. Described more specifically, the second calculating portion 86 calculates the angles αDogOSG corresponding to the rotary angular positions (angles of rotation) of the dog teeth 48 of the second dog member 38 with respect to the point O of mutual meshing of the teeth 58 and 60, according to the equation (3) given above. In this respect, it is noted that the gear ratio i in the equation (3) is the gear ratio i of the shift gear 30 and the counter gear 32 corresponding to the selected speed position to be established.

The engagement control portion 82 calculates the angle Δα of relative rotation of the dog teeth 46 and the dog teeth 48 according to the equation (2), and on the basis of the angles αDogDR which have been calculated by the first calculating portion 84 and which correspond to the rotary angular positions of the dog teeth 46 of the first dog member 34, and the angles αDogOSG which have been calculated by the second calculating portion 86 and which correspond to the rotary angular positions of the dog teeth 48 of the second dog member 38. The engagement control portion 82 also calculates the value Dogfrac according to the equation (1). It is noted that the number #dogs in the equation (1) is the number corresponding to the selected speed position to be established.

At a moment of initiation of mutual engagement of the dog teeth 46 and 48, or immediately before this moment of initiation, the engagement control portion 82 determines whether the calculated value Dogfrac is held within a predetermined range in which there is not a risk of butting of the dog teeth 46 and the dog teeth 48 against each other. This predetermined range is set by taking account of the speed of the relative rotation of the dog teeth 46 and 48. If the engagement control portion 82 determines that the value Dogfrac is held within the predetermined range, the engagement control portion 82 commands the actuator 35 of the shifting mechanism 33 to bring the first dog member 34 into engagement with the second dog member 38.

Figure 8:
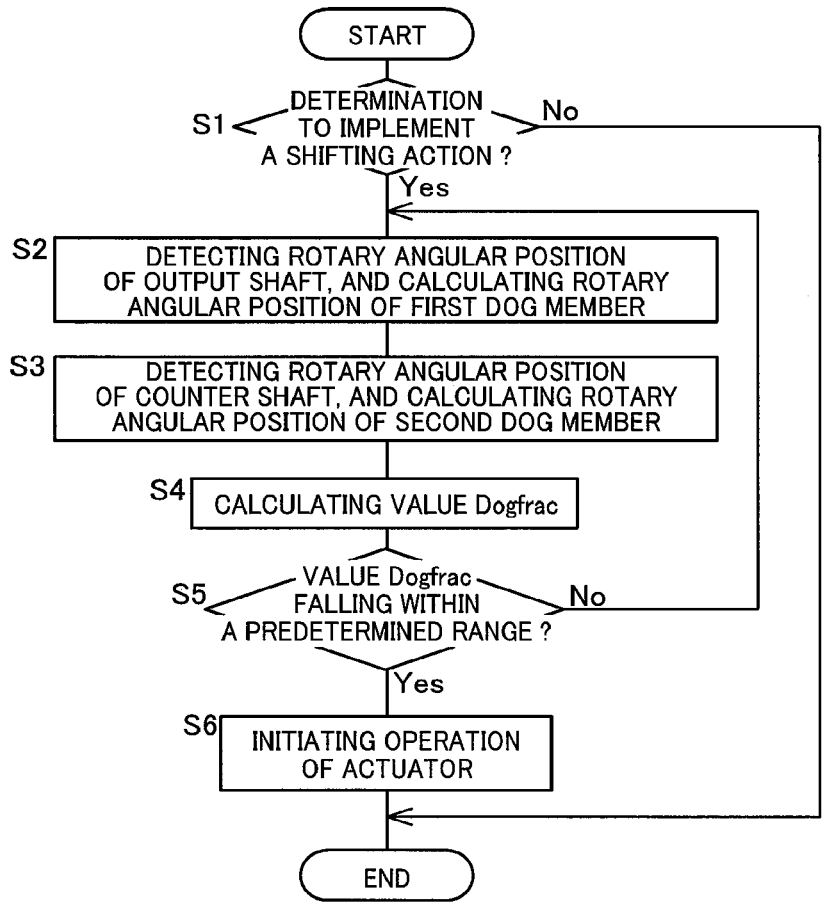
FIG. 8 is a flow chart illustrating an essential part of a control routine executed by the electronic control device of FIG. 7, namely, a control operation to control a shifting action of the transmission.

Reference is now made to the flow chart of FIG. 8 illustrating an essential part of a control routine executed by the electronic control device 80, namely, a control operation to control a shifting action of the transmission 10. The control routine shown in the flow chart is repeatedly executed during running of the vehicle.

The control routine is initiated with a step S1 corresponding to the function of the engagement control portion 82, to determine whether the transmission 10 should be shifted from the presently selected one of the speed positions to another. This determination is made on the basis of a running state of the vehicle represented by a running speed V of the vehicle (a rotating speed Nout of the output shaft 22) and an operation amount θacc of an accelerator pedal (angle θth of opening of a throttle valve), and according to a predetermined shifting map having two parameters of the vehicle running speed V and the accelerator pedal operation amount θacc. An affirmative determination is obtained in the step S1, when the running state of the vehicle satisfies a shifting condition defined by the shifting map, or when a shifting command is generated as a result of an operation of a manual shifting member by the operator of the vehicle. When a negative determination is obtained in the step S1, one cycle of execution of the present control routine is terminated.

When the affirmative determination is obtained in the step S1, the control flow goes to a step S2 corresponding to the function of the first calculating portion 84, to calculate the angle αDogDR corresponding to the rotary angular positions (angles of rotation) of the dog teeth 46 of the first dog member 34 with respect to the point O of mutual meshing of the teeth 58 and 60, according to the equation (4). Then, the control flow goes to a step S3 corresponding to the function of the second calculating portion 86, to calculate the angle αDogOSG corresponding to the rotary angular positions (angles of rotation) of the dog teeth 48 of the second dog member 38 with respect to the point O of mutual meshing of the teeth 58 and 60, according to the equation (3). The control flow then goes to a step S4 corresponding to the function of the engagement control portion 82, to calculate the value Dogfrac on the basis of the angles αDogDR and αDogOSC respectively calculated in the steps S2 and S3, and according to the equations (1) and (2). The step S4 is followed by a step S5 also corresponding to the function of the engagement control portion 82, to determine whether the value Dogfrac falls within the predetermined range or not. When the value Dogfrac does not fall within the predetermined range, a negative determination is obtained in the step S5, and the control flow goes back to the step S2. When the value Dogfrac falls within the predetermined range, an affirmative determination is obtained in the step S5, and the control flow goes to a step S6 also corresponding to the function of the engagement control portion 82, to command the actuator 35 to rotate the shifting shaft 40 to the rotary angular position corresponding to the selected speed position to which the transmission 10 is required to be shifted, whereby the dog teeth 46 and the dog teeth 48 of the first and second dog members 34 and 38 corresponding to the selected speed position are brought into engagement with each other. Since the actuator 35 is operated only where the value Dogfrac falls within the predetermined range, the risk of butting of the dot teeth 46 and the dog teeth 48 against each other during the shifting action of the transmission 10 can be reduced.

In the present embodiment, the absolute rotary encoders are used as the rotary angle sensors 50 and 54 for respectively detecting the rotary angular positions of the counter shaft 20 and the output shaft 22. Accordingly, the rotary angular positions (angles of rotation) of the dog teeth 46 and 48 can be calculated on the basis of the detected rotary angular positions (angles of rotation) of the master splines 52 and 56, even when the detection takes place immediately after power application to a vehicular control system including the electronic control device 80. Accordingly, even when the first and second dog members 34 and 38 are brought into engagement with each other immediately after the power application to the vehicular control system, the relative rotary angular position of the dog teeth 46 and 48 can be obtained so that the risk of mutual butting of the dog teeth 46 and 48 can be reduced. Namely, the present embodiment is configured to reduce the risk of mutual butting of the dog teeth 46 and 48, which would be encountered in the prior art as a result of engagement of the dog teeth 46 and 48 implemented at an arbitrary timing during a first run of the vehicle after the power application, to store the adequate relative rotary angular positions of the dog teeth 46 and 48 in a memory by means of a learning control technique, as initial or zero positions. Accordingly, the present embodiment makes it possible to reduce reliability and stability of shifting actions of the transmission 10 prior to completion of learning of the adequate relative rotary angular positions. In addition, the present embodiment eliminates a need to implement the learning to obtain the adequate relative rotary angular positions of the dog teeth 46 and 48 upon each power application to the vehicular control system, making it possible to reduce a risk of deterioration of shifting stability of the transmission 10 due to long and frequent learning to obtain the adequate rotary angular positions. Further, the present embodiment eliminates a need to use rotary angle sensors for each of the speed positions, for eliminating the need for the learning, and a need to detect the rotary angular positions of the counter shaft 20 and the output shaft 22 during parking of the vehicle.

The present embodiment of the invention described above is configured such that the first dog members 34 are rotated together with the output shaft 22, so that the rotary angular position of the first dog members 34 (dog teeth 46) can be calculated on the rotary angular position of the output shaft 22. In addition, the counter shaft 20 is rotated together with the counter gears 32 which mesh with the shift gears 30, so that the rotary angular position of the second dog members 38 (dog teeth 48) rotated together with the shift gears 30 can be calculated on the rotary angular position of the counter shaft 20. Accordingly, the rotary angular positions of the first and second dog members 34 and 38 can be calculated on the basis of the detected rotary angular positions of the output and counter shafts 22 and 20, even when the detection of the rotary angular positions of the output and counter shafts 22 and 20 takes place immediately after power application to the vehicular control system including the electronic control device 80. Since the relative rotary angular position of the first and second dog members 34 and 38 can be calculated immediately after the power application to the vehicular control system, the first and second dog members 34 and 38 can be brought into engagement with each other, without butting of the dog teeth 46 of the first dog members 34 and the dog teeth 48 of the second dog members 38 against each other.

The present embodiment is further configured such that the plurality of dog clutches 28 and the plurality of shift gears 30 are mounted on the output shaft 22, so that the rotary angular positions of the first and second dog members 34 and 38 of each of the dog clutches 28a-28c can be calculated on the basis of the detected rotary angular positions of the output shaft 22 and the counter shaft 20, without a need of using rotary angle sensors for detecting the rotary angular positions of the first and second dog members 34 and 38 for each of the plurality of dog clutches 28. Accordingly, the required number of the rotary angle sensors can be reduced.

The present embodiment is also configured such that the number of the dog teeth 46 of the first dog members 34 and the number of the dog teeth 48 of the second dog members 38 are determined to be equal to a reciprocal of the gear ratio i of the shift gear 30 and the counter gear 32, or a multiple of the reciprocal. Accordingly, the dog teeth 48 of the second dog members 38 have the same rotary angular phase each time the counter gear 32 is rotated by 360°, so that the rotary angular positions of the dog teeth 48 of the second dog members 38 can be calculated on the basis of the detected rotary angular position of the counter shaft 20.

The present embodiment is further configured such that the output shaft 22 and the counter shaft 20 are provided with the respective master splines 56 and 52, so that the first dog members 34, shift gears 30 and counter gears 32 can be mounted on the output and counter shafts 22 and 20, at predetermined rotary angular positions with respect to the rotary angular positions of the master splines 56 and 52 which are used as reference positions. In addition, absolute rotary angular positions of the output and counter shafts 22 and 20 can be detected or determined on the basis of the rotary angular positions of these master splines 56 and 52.

While the preferred embodiment of this invention has been described in detail by reference to the drawings, it is to be understood that the invention may be otherwise embodied.

The transmission 10 according to the illustrated embodiment has five forward drive speed positions. However, the transmission to be controlled according to the present invention may have any other number of forward speed positions, such as 2-4 or 6 or more speed positions. In other words, the numbers of the dog clutches 28 and the shift gears 30 mounted on the output shaft 22 are not limited to those in the illustrated embodiment, and may be suitably selected.

In the illustrated embodiment, the second calculating portion 86 is operated after the operation of the first calculating portion 84. However, the operation of the second calculating portion 86 may precede the operation of the first calculating portion 84, or the operations of the first and second calculating portions 84 and 86 may be performed concurrently with each other.

While the dog clutches 28 are mounted on the output shaft 22 in the illustrated embodiment, the dog clutches 28 may be mounted on the counter shaft 20.

In the illustrated embodiment, the master splines 52 and 56 are formed so as to protrude from the outer circumferential surfaces of the counter and output shafts 20 and 22 in the radially outward direction. However, the master splines 52 and 56 may be replaced by master slots formed in the outer circumferential surfaces of the counter and output shafts 20 and 22, radially inwardly of the outer circumferential surfaces. Namely, the counter and output shafts 20 and 22 may have any other form that can be used as their reference rotary angular positions.

Although the permissible range of the number #dogs of the dog teeth 46 and 48 is set to be 3~15, by way of example, the permissible range may be otherwise set as needed.

While the rotary angle sensors 50 and 54 are optical type absolute rotary encoders in the illustrated embodiment, these rotary angle sensors 50 and 54 may be replaced by any other type of sensors capable of detecting absolute rotary angular positions of the counter and output counter shafts 20 and 22 even when the detection takes place immediately after power application to the vehicular control system.

It is to be understood that the embodiment and modifications described above are given for illustrative purpose only, and that the present invention may be embodied with various other changes and improvements which may occur to those skilled in the art.

NOMENCLATURE OF ELEMENTS

10: Vehicular transmission
20: Counter shaft (Second shaft)
22: Output shaft (First shaft)
28a-28c: Dog clutches
30a-30e: Shift gears (First gears)
32a-32e: Counter gears (Second gears)
33: Shifting mechanism
34a-34c: First dog members
38a-38e: Second dog members
46: Dog teeth
48: Dog teeth
52, 56: Master splines
80: Electronic control device (Control apparatus)
82: Engagement control portion
84: First calculating portion
86: Second calculating portion

What is claimed is:

1. A control apparatus for a vehicular transmission including (a) at least one dog clutch each having a first dog member mounted on a first shaft such that the first dog member is rotated together with the first shaft, and at least one second dog member each mounted to be axially adjacent to the first dog member and rotatable relative to the first shaft, (b) first gears each mounted to be rotatable relative to the first shaft and provided with the second dog member, (c) second gears which are mounted such that the second gears are rotated together with a second shaft parallel to the first shaft, and the second gars mesh with the respective first gears, and (d) a shifting mechanism configured to selectively place each dog clutch in an engaged or released state, said control apparatus comprising:

a first calculating portion configured to detect a rotary angular position of the first shaft, and to calculate a rotary angular position of the first dog member on the basis of the detected rotary angular position of the first shaft;

a second calculating portion configured to detect a rotary angular position of the second shaft, and to calculate a rotary angular position of each second dog member on the basis of the detected rotary angular position of the second shaft; and an engagement control portion configured to control the shifting mechanism on the basis of the rotary angular positions of the first and second dog members, for engagement of the first and second dog members with each other.

2. The control apparatus according to claim 1, wherein said at least one dog clutch consists of a plurality of dog clutches mounted on the first shaft.

3. The control apparatus according to claim 1, wherein a number of dog teeth of each of the first dog members and a number of dog teeth of each of the second dog members are determined to be equal to a reciprocal of a gear ratio of the first and second gears, or a multiple of the reciprocal.

4. The control apparatus according to claim 2, wherein number of dog teeth of each of the first dog members and a number of dog teeth of each of the second dog members are determined to be equal to a reciprocal of a gear ratio of the first and second gears, or a multiple of the reciprocal.

5. The control apparatus according to claim 1, wherein the first shaft and the second shaft are provided with respective master splines.

6. The control apparatus according to claim 2, wherein the first shaft and the second shaft are provided with respective master splines.

7. The control apparatus according to claim 3, wherein the first shaft and the second shaft are provided with respective master splines.

8. The control apparatus according to claim 4, wherein the first shaft and the second shaft are provided with respective master splines.

* * * * *